United States Patent [19]

Petersen et al.

[11] 4,042,383

[45] * Aug. 16, 1977

[54] WROUGHT FILLER METAL FOR WELDING HIGHLY-CASTABLE, OXIDATION RESISTANT, NICKEL-CONTAINING ALLOYS

[75] Inventors: Walter Adrian Petersen, Ridgewood, N.J.; Robin Mackay Forbes Jones, Suffern, N.Y.

[73] Assignee: The International Nickel Company, Inc., New York, N.Y.

[*] Notice: The portion of the term of this patent subsequent to July 1, 1992, has been disclaimed.

[21] Appl. No.: 686,721

[22] Filed: May 17, 1976

Related U.S. Application Data

[63] Continuation of Ser. No. 487,316, July 10, 1974, abandoned.

[51] Int. Cl.$^2$ .................. C22C 19/05; C22C 30/00
[52] U.S. Cl. ............................. 75/171; 75/122; 75/134 F; 219/145
[58] Field of Search ............... 75/122, 134 P, 128 W, 75/128 F, 171; 219/145

[56] References Cited

U.S. PATENT DOCUMENTS

| | | | |
|---|---|---|---|
| 2,403,128 | 7/1946 | Scott et al. | 75/171 |
| 2,743,175 | 4/1956 | Talbot | 75/128 |
| 3,582,318 | 6/1971 | Szumachowski | 75/122 |
| 3,726,668 | 4/1973 | Baumel | 75/128 W |
| 3,892,541 | 7/1975 | Jones et al. | 75/134 F |

FOREIGN PATENT DOCUMENTS

| | | |
|---|---|---|
| 70616/74 | 1/1976 | Australia |
| 735,991 | 6/1943 | Germany |

OTHER PUBLICATIONS

Medovar et al., "Effects of Boron on the Properties and Weldability of Ni-Base Alloys," Avt. Svarka, No. 2, 16–20, 1969.

*Primary Examiner*—Arthur J. Steiner
*Attorney, Agent, or Firm*—Walter A. Petersen; Ewan C. MacQueen; Raymond J. Kenny

[57] ABSTRACT

An alloy particularly directed to use as a wrought filler metal and contains certain percentages of chromium, iron, boron, molybdenum, nickel and optionally carbon, manganese and silicon.

4 Claims, No Drawings

WROUGHT FILLER METAL FOR WELDING HIGHLY-CASTABLE, OXIDATION RESISTANT, NICKEL-CONTAINING ALLOYS

This is a continuation, of application Ser. No. 487,316, filed July 10, 1974, now abandoned.

The present invention relates to nickel-base alloys having workability and weldability and, more particularly, to wrought filler wire for use in the general welding of high nickel alloys and inert gas shielded-arc welding of highly castable, oxidation-resistant, nickel-base alloys.

There is a need in the art to weld oxidation-resistant nickel-base alloys under a variety of industrial conditions. As a filler wire, for example, the alloy should be suitable for welding with all major arc-welding processes, e.g., gas tungsten-arc, gas metal-arc, submerged-arc, and be capable of producing sound welded joints under conditions imposing severe restraint and difficult parameters for both thin and heavy section welds. It is also desirable that the alloy be suitable for use as a core wire in a covered electrode.

While sound welds may be made in many instances with matching composition filler material, industry prefers that continuous, high deposition-rate welding processes be employed said processes requiring however, that the filler metal be readily workable to forms such as wire. Cast filler materials for high production rate welding processes are not economically feasible and it is essential that the filler material be at least hot workable in order to afford the advantages of continuous welding processes. More advantageously, the alloy should be cold workable, allowing the alloy to be formed to thin cross-sections, e.g., wire, which is the form predominantly used in continuous high deposition-rate welding processes.

One particular application requiring a wrought filler metal is for the welding of a highly castable, oxidation-resistant, nickel-base alloy comprising nominally 21% chromium, 19% iron, 6% molybdenum, 3% silicon and 0.3% boron. This alloy is particularly suitable for the conventional casting of components having an intricate design and is also weldable, allowing fabrication of several small components into one large unit and for repairing of casting defects or even service damage. However, the alloy is not workable nor, insofar as we are aware are other suitable wrought filler materials available for welding this alloy.

It has now been discovered that sound welds, which are free from cracking and porosity and which have oxidation resistance equivalent to that of the base alloy, can be made under conditions imposing severe restraint by welding with a specially formulated wrought filler wire.

It is an object of the invention to provide a wrought filler wire suitable for welding nickel-base alloys.

The invention also contemplates an alloy composition having a combination of characteristics including excellent workability and weldability.

Other objects and advantages will become apparent from the following description.

Generally speaking, the present invention contemplates a wrought filler alloy containing (by weight) up to about 0.2% carbon, up to about 4.5% manganese, up to about 1.5% silicon, from about 18% to about 30% chromium, from about 5% to about 50% iron, from about 0.1% to about 1% boron, from about 3% to about 9% molybdenum, and the balance essentially nickel. As will be understood by those skilled in the art, the use of the expression "balance essentially" in referring to the nickel content of the alloys does not exclude the presence of other elements commonly present as incidental constituents and impurities.

In carrying the invention into practice, it is preferred that the wrought filler alloy contain up to about 0.1% carbon, up to about 2% manganese, up to about 1% silicon, from about 19% to about 24% chromium, from about 15% to about 25% iron, from about 0.12% to about 0.4% boron, from about 4% to about 8% molybdenum, and the balance, in an amount of at least about 30%, essentially nickel.

A still more preferred wrought filler alloy contains from about 0.003% to about 0.06% carbon, up to about 1% manganese, up to about 0.4% silicon, from about 20% to about 24% chromium, from about 17% to about 23% iron, from about 0.15% to about 0.4% boron, from about 5% to about 7% molybdenum and the balance, in an amount of at least about 30%, essentially nickel.

Carbon has been found to have a detrimental effect on the workability of the alloy and must be maintained at levels below about 0.2%, and preferably only up to about 0.1%, to achieve the desired working characteristics of this alloy. Advantageously, it is preferred that the carbon be maintained from about 0.003% to about 0.06% in the interests of workability.

Manganese may be maintained in the alloy at levels up to about 4.5%, but in the interest of stress-rupture life, manganese should be limited to levels up to about 2% and preferably, up to about 1%. Silicon has a detrimental effect on the workability of the alloy and should be maintained at levels not above about 1.5% and preferably not in excess of about 1%. Silicon also had a detrimental effect on the oxidation resistance of the alloy; however, the presence of silicon up to about 0.4% is desirable to produce an alloy having both excellent oxidation resistance and workability.

Chromium is essential in the alloy for oxidation resistance at elevated temperatures. Chromium also affects the weldability of the alloy and should be maintained above about 18% for this purpose. While chromium levels up to about 28.4% chromium have produced satisfactory-welds, the upper limit for chromium is about 30% in order to insure freedom from the formation of deleterious sigma phase. It would be expected that alloys approaching the upper limit of about 30% chromium would start to exhibit edge cracking in hot working and would be more difficult to cold work. It is preferred that a compositional range of about 19% to about 24% be employed.

Iron, at levels below about 5% are not weldable as they exhibit severe weld cracking. The upper limit for iron is dictated by its effect on the oxidation resistance of the alloy and should be maintained below about 50% for this purpose. A desirable combination of weldability and oxidation-resistance properties are achieved at iron levels from about 15% to about 25%.

Boron at levels below about 0.1% has a detrimental effect on both hot workability and weldability. Alloys containing boron up to about 1% are hot workable; however, in order to achieve an alloy having hot workability and cold workability properties, it is preferred that the boron be maintained in the range from about 0.12% to about 0.4%. Boron also affects the oxidation resistance of the alloy and for this purpose should be maintained in the range from about 0.12% to about 0.4%.

It is believed that molybdenum imparts a tolerance for elements, e.g., boron, which might detrimentally affect the weldability characteristics of the alloy composition. Molybdenum should be maintained within the range of about 3% to about 9%, preferably from about 4% to about 8% and most advantageously, from about 5% to about 7%. Molybdenum levels at the lower part of the range of 3% result in an alloy having a reduced oxidation resistance and the upper limit of 9% is dictated by its effect on the decreased workability of the alloy and the onset of weld cracking.

Nickel contributes to the elevated temperature oxidation resistance of the alloy and suppresses the embrittling sigma-forming tendencies of silicon, molybdenum and chromium. While the nickel composition may vary widely, depending on the percentages of the other elements, it is desirable that nickel be present in an amount of at least about 30% to achieve a desired combination of properties.

Aluminum or other suitable deoxidation elements are desirably added to the alloy melt; an aluminum level of up to about 0.1% has been found to be quite satisfactory. Levels significantly above say, 0.15% for example, 0.5%, should be avoided however, since such levels tend to detract from the workability of the alloy. Consistent with good steel-making practice, other additives, such as desulfurizing agents and the like, may also be added to the melt. Phosphorous and sulfur may have a detrimental influence on workability and weldability and should be maintained at levels less than about 0.04%.

For the purpose of giving those skilled in the art a better understanding of the invention, the following examples are given:

EXAMPLE I

To demonstrate the excellent workability and weldability of alloys in this invention, various alloy compositions were prepared. As shown in Table I, Alloy Nos. 1–22 are within the invention and Alloy Nos. A–L are outside the scope of this invention. All alloys were prepared by air-induction melting at a temperature of about 2900° F. a charge consisting of electrolytic nickel, low carbon chromium and electrolytic iron. The temperature of the melt was then reduced to about 2800° F. and carbon added as high carbon (10%) chromium metal, followed by electrolytic manganese, metallic silicon, molybdenum pellets, rod aluminum and a nickel-boron alloy (about 16% boron). The melts were poured at about 2750° F. into four-inch square cross-section cast-iron molds. The ingots were soaked for about four hours at about 2100° F., hot-rolled to about 2½-inch to 3-inch square billets, cut in half, and resoaked for about one hour at about 2100° F. One sample was then hot-rolled to one-inch plate and the other sample hot-rolled to ⅝-inch square bar stock. To test the cold workability of the alloy, the ⅝-inch square bar stock was tested by forming wire using two different procedures: (1) Anneal for one hour at 2100° F. and machined to 9/16-inch diameter draw bar. The bar was drawn to 0.062-inch diameter wire with intermediate anneals at 2100° F.; (2) Anneal for about one hours at 2100° F., cold roll 8 passes in a rolling mill, anneal for about ½ hour at 2100° F., cold roll an additional 8 passes and anneal for about ½ hour at 2100° F. Cold roll 3 passes and swage to 0.14-inch diameter wire. The wire was then centerless ground to ⅛-inch diameter.

Weld screening tests were performed by employing an autogenous Bead-on-Plate test on the hot-rolled 1-inch plate using an automatic gas tungsten-arc at about 250 amperes, 11 volts and 16-inch/minute (ipm) travel speed. The weld deposit and attendant heat-affected zone were examined for cracking visually and at ten magnifications (10×) with a binocular microscope. The results of the weldability and workability tests are shown hereinbelow in Table II.

TABLE I

| Alloy No. | C % | Mn % | Si % | Cr % | Mo % | Al % | Fe % | B % |
|---|---|---|---|---|---|---|---|---|
| 1 | 0.007 | 0.26 | 0.32 | 21.8 | 6.0 | 0.03 | 19.4 | 0.13 |
| 2 | 0.007 | 0.29 | 0.30 | 22.6 | 6.0 | 0.021 | 19.1 | 0.29 |
| 3 | 0.005 | 0.25 | 0.27 | 22.6 | 6.0 | 0.036 | 19.2 | 0.40 |
| 4 | 0.035 | 0.19 | 0.33 | 21.2 | 5.8 | 0.14 | 20.1 | 0.15 |
| 5 | 0.042 | 0.22 | 0.31 | 28.4 | 5.9 | 0.080 | 11.4 | 0.30 |
| o | 0.032 | 0.17 | 0.30 | 21.8 | 6.2 | 0.035 | 38.0 | 0.13 |
| p | 0.031 | 0.17 | 0.30 | 22.3 | 6.3 | 0.028 | 47.4 | 0.15 |
| 8 | 0.036 | 0.30 | 0.35 | 21.2 | 6.1 | 0.13 | 19.4 | 0.19 |
| 9 | 0.033 | 4.25 | 0.32 | 21.2 | 6.0 | 0.044 | 19.2 | 0.17 |
| 10 | 0.038 | 0.30 | 0.42 | 21.5 | 6.0 | 0.016 | 19.5 | 0.79 |
| 11 | 0.085 | 0.25 | 21.2 | 6.1 | 0.10 | 18.4 | 0.22 | |
| | 0.24 | | | | | | | |
| 12 | 0.032 | 0.21 | 0.30 | 21.4 | 4.0 | 0.045 | 19.8 | 0.25 |
| 13 | 0.11 | 0.22 | 0.26 | 21.5 | 5.9 | 0.036 | 20.0 | 0.18 |
| 14 | 0.035 | 0.018 | 0.33 | 21.5 | 5.9 | 0.032 | 19.2 | 0.15 |
| 15 | 0.031 | 1.55 | 0.32 | 21.9 | 5.9 | 0.031 | 19.1 | 0.15 |
| 16 | 0.033 | 0.21 | 0.05 | 21.7 | 6.0 | 0.020 | 19.2 | 0.12 |
| 17 | 0.030 | 0.20 | 0.49 | 21.6 | 5.9 | 0.013 | 19.3 | 0.13 |
| 18 | 0.035 | 0.25 | 0.89 | 21.4 | 6.0 | 0.030 | 19.2 | 0.14 |
| 19 | 0.032 | 0.21 | 0.30 | 21.4 | 4.0 | 0.045 | 19.8 | 0.25 |
| 20 | 0.033 | 0.18 | 0.32 | 21.9 | 8.2 | 0.015 | 19.1 | 0.14 |
| 21 | 0.033 | 0.21 | 0.24 | 22.3 | 4.2 | 0.036 | 40.8 | 0.28 |
| 22 | 0.005 | 0.25 | 0.27 | 22.6 | 6.0 | 0.036 | 19.2 | 0.40 |
| A | 0.51 | 0.12 | 0.29 | 22.2 | 4.2 | 0.019 | 22.1 | 0.23 |
| B | 0.011 | 4.3 | 2.9 | 20.7 | 6.3 | 0.05 | 19.6 | 0.30 |
| C | 0.014 | 0.27 | 3.1 | 23.9 | 6.1 | 0.09 | 19.3 | 0.30 |
| D | 0.004 | 0.26 | 0.30 | 21.8 | 6.0 | 0.04 | 18.8 | nil |
| E | 0.031 | 0.24 | 0.30 | 21.5 | 5.9 | 0.017 | 19.5 | 0.037 |
| F | 0.037 | 0.22 | 0.27 | 19.6 | 5.5 | 0.022 | 1.3 | 0.26 |
| G | 0.029 | 0.23 | 0.30 | 22.1 | 5.6 | 0.063 | 3.6 | 0.16 |
| H | 0.30 | 0.21 | 0.27 | 21.4 | 5.95 | 0.061 | 20.0 | 0.21 |
| I | 0.031 | 0.25 | 0.27 | 17.2 | 5.84 | 0.048 | 21.4 | 0.25 |
| J* | 0.032 | 0.28 | 0.29 | 21.5 | 6.0 | 0.11 | 19.2 | 0.006 |
| K | 0.029 | 0.19 | 0.31 | 21.8 | 8.7 | 0.032 | 19.3 | 0.001 |
| L | 0.025 | 0.28 | 0.34 | 21.2 | 6.0 | 0.013 | 19.3 | 0.092 |

NOTE:
Balance Ni
* = 0.17 Ti and 0.018 Mg

TABLE II

| Alloy No. | Hot Workability | Cold Workability | Bead-On-Plate Test |
|---|---|---|---|
| 1 | OK | OK | OK |
| 2 | OK | OK | OK |
| 3 | OK | OK | OK |
| 4 | OK | OK | OK |
| 5 | OK | OK, Difficult to work | OK |
| o | OK (smoked) | OK | OK |
| p | OK (smoked) | OK | OK |
| 8 | OK Difficult to work | N.T. | OK |
| 9 | OK | Minor Cracking | OK |
| 10 | Edge Cracking | Broke Up | OK |
| 11 | OK | OK, Difficult to work | |
| 12 | OK | OK | OK |
| 13 | Slight Edge Cracking | Broke Up | |
| 14 | Slight Edge Cracking | OK | OK |
| 15 | OK | OK | OK |
| 16 | Slight Edge Cracking | OK | OK |
| 17 | Slight Edge Cracking | OK | OK |
| 18 | OK | OK | OK |
| 19 | OK | OK | OK |
| 20 | Some Edge Cracking | OK | OK |
| 21 | OK | OK | OK |
| 22 | OK | OK | OK |
| A | Broke Up | N.T. | N.T. |
| B | N.T. | N.T. | Severe Weld Cracking |
| C | Edge Cracking | Broke Up | OK |
| D | Broke Up | N.T. | N.T. |
| E | Slight Edge Cracking | OK | Severe Weld Cracking |

TABLE II-continued

| Alloy No. | Hot Workability | Cold Workability | Bead-On-Plate Test |
|---|---|---|---|
| F | OK | Some End Cracking | Severe Cracking |
| G* | OK | Minor Cracking | OK |
| H | Broke Up | N.T. | N.T. |
| I* | Slight Edge Cracking | OK | OK |
| J* | Some Edge Cracking | OK | OK |
| K | Broke Up | N.T. | N.T. |
| L* | OK | OK | OK |

*= These alloys failed the welding tests in 1" plate as shown hereinbelow in Example II.
N.T. = Not Tested As can be seen from the results shown hereinabove in Table II, all the alloys of the invention passed the Bead-on-Plate; weldability test and most of the alloys of the invention exhibited excellent hot workability and cold workability properties, e.g., Alloys Nos. 2,3,4,12,19 and 22 are alloys within the preferred compositional range and show excellent hot workability and cold workability. The other alloys of the invention are examples of compositional ranges outside the preferred ranges and evidence the effect of producing an alloy having a composition outside the preferred ranges.

The results concerning the alloys outside the invention clearly demonstrate however, that the composition must be maintained within the broad ranges in order to produce an alloy having the desired characteristics. Regarding workability, for example, Alloy Nos. A and H show the disastrous effect caused by a high carbon content, to wit, greater than 0.30%. The other alloys similarly show the detrimental effects of silicon, chromium, iron and boron.

As a further demonstration of the excellent cold working characteristics of the preferred alloy, the hot rolled ½-inch plate of Alloy No. 4 was surfaced and cold rolled to 0.130-inch thick without intermediate annealing; this represents a 74% reduction. This sheet was then annealed for about ½ hour at 2100° F. and cold rolled to 0.050-inch thick sheet, a reduction of 62%.

The resulting sheet was of excellent quality, there being no evidence of tearing or edge cracking. Discs of 60, 64 and 70 millimeters (mm) diameter were cut from this sheet and subjected to the Swift Cup Test. No defects were found in these specimens and they exhibited excellent drawing characteristics.

EXAMPLE II

To demonstrate the ability of alloys of this invention to be used as filler metals, a number of the alloys shown hereinabove in Table I were employed under conditions imposing severe restraint to weld ½-inch and 1-inch thick plates. The ½-inch plate had a 60° V-bevel, a 3/32-inch root face and a ⅛-inch root opening. The 1-inch plate had a U-groove preparation (15° bevel, ¼-inch radius, 3/32-inch root face and ⅛-inch root opening). Three methods of welding were employed, to wit, Manual Gas Tungsten-Arc (GTA) at 16 volts, 200 amperes, at a speed of approximately 3 ipm; Automatic Gas Metal-Arc (GMA) at 33 volts, 300 amperes and 10 ipm; and manual covered electrode (CE) at 24 volts, 85 amperes and approximately 3 ipm. As described hereinabove in Example I, the ⅛-inch wire was used for the GTA welds and the 0.062-inch wire was used for the GMA welds. The base plate compositions are given hereinbelow in Table III and represent typical materials contemplated to be welded using alloys of this invention. Table IV shows the details of the tests on the welded joints and Table V shows the results of standard stress rupture-life tests performed on the transverse weld slices. The welding tests shown hereinbelow in Table IV were performed by cutting the welded joints into transverse slices, polishing, etching with Lepito's reagent and examining for cracking at 10× with a binocular microscope. About 6 or 7 slices (12 or 14 transverse faces) per welded joint were examined. The Bend-Tests were performed by bending a ⅜-inch transverse weld slice about a 1½-inch diameter pin. These were reexamined microscopically at 10× for defects.

TABLE III

| Alloy No. | C % | Mn % | Si % | Cr % | Mo % | Al % | Fe % | B % | Ni % |
|---|---|---|---|---|---|---|---|---|---|
| BP1 | 0.017 | 0.27 | 3.2 | 24.1 | 6.0 | 0.11 | 19.3 | 0.32 | (46.68) |
| BP2 | 0.01 | 0.26 | 3.18 | 22.6 | 6.0 | 0.11 | 18.9 | 0.31 | (48.63) |
| BP3 | 0.05 | 0.21 | 0.26 | 15.7 | N.A. | 0.10 | 7.1 | N.A. | (76.58) |
| BP4 | 0.05 | 0.88 | 0.39 | 20.92 | N.A. | N.A. | 46.9 | N.A. | (30.86) |
| BP5 | 0.011 | 0.48 | 2.9 | 21.4 | 6.8 | N.A. | 19.0 | 0.31 | (49.1) |
| BP6 | 0.01 | 0.25 | 3.15 | 21.8 | 6.1 | 0.12 | 18.9 | 0.32 | (49.35) |
| BP7 | 0.90 | 2.28 | 2.76 | 20.0 | N.A. | 0.01 | (33.42) | 0.13 | 40.5 |
| BP8 | 0.016 | 0.20 | 3.17 | 22.0 | 6.1 | 0.013 | 18.2 | 0.34 | (49.96) |
| BP9 | 0.020 | 0.22 | 3.20 | 22.0 | 6.1 | 0.01 | 18.1 | 0.33 | (50.02) |
| BP10 | 0.44 | 0.96 | 1.84 | 26.0 | N.A. | 0.047 | (50.31) | N.A. | 20.4 |
| BP11 | 0.03 | 0.86 | 0.33 | 20.9 | N.A. | 0.36 | (45.72) | N.A. | 31.8 |
| BP12 |  |  |  |  |  |  |  |  |  |
| BP13* | 0.01 | 0.5 | 0.2 | 21.0 |  | 9 | 19 | N.A. | Bal. |

() = Calculated by difference
N.A. = Not Added
*= Nominal composition - also contains 1.5 Cr and 0.5W

TABLE IV

| Weld No. | Filler Alloy No. | Base Plate Alloy No. Process | ness | Plate Thick- Slices | Cracks/Section Transverse (Bend Angle) | Bend Test |
|---|---|---|---|---|---|---|
| 1 | 1 | BP7 | GTA | ½ | 0 | N.T. |
| 2 | 12 | BP8 | GTA | 1 | 0 | N.T. |
| 3 | 1 | BP2 | GMA | 1 | 0 | N.T. |
| 4 | 2 | BP5 | CE | 1 | 0 | N.T. |
| 5 | 1 | BP3/BP4 | GTA | ½ | 0 | N.T. |
| 6 | 3 | BP9/BP10 | GMA | 1 | 0 | N.T. |
| 7 | 3 | BP9/BP11 | GMA | 1 | 0 | N.T. |
| 8 | 3 | BP12 | GMA | ½ | 0 | N.T. |
| 9 | 14 | 14 | GTA | 1 | .11 | 3(180°) |
| 10 | 15 | 15 | GTA | 1 | 0 | 6(180°) |

TABLE IV-continued

| Weld No. | Filler Alloy No. | Base Plate Alloy No. | Process | Plate Thickness Slices | Cracks/Section Transverse (Bend Angle) | Bend Test |
|---|---|---|---|---|---|---|
| 11 | 9 | 9 | GTA | 1 | 0 | (6) (78°) |
| 12 | 16 | 16 | GTA | 1 | 0 | (6) (82°) |
| 13 | 17 | 17 | GTA | 1 | .11 | 8 (180°) |
| 14 | 18 | 18 | GTA | 1 | 0 | (6) (80°) |
| 15 | 5 | 5 | GMA | 1 | 0 | (6) (80°) |
| 16 | 19 | 19 | GTA | 1 | 0 | 0 (180°) |
| 17 | 20 | 20 | GTA | 1 | .22 | 6 (180°) |
| 18 | 0 | 0 | GTA | 1 | 0 | 0 (180°) |
| 19 | p | p | GTA | 1 | 0 | (6) (42°) |
| 20 | 21 | 21 | GTA | 1 | 0 | (6) (66°) |
| 21 | 22 | BP6 | GMA | 1 | 0 | N.T. |
| 22 | 4 | 10 | GTA | 1 | 0 | (6) (28°) |
| 23 | 1 | BP1 | GTA | ½ | 0 | N.T. |
| 24 | 2 | BP5 | GTA | ½ | 0 | N.T. |
| 25 | 3 | BP5 | GTA | ½ | 0 | N.T. |
| 26 | 3 | 2 | GTA | 1 | 0 | N.T. |
| A | I | I | GTA | 1 | 1.6 | N.T. |
| B | F | F | GMA | 1 | Severe Cracking 2nd pass | N.T. |
| C | G | G | GTA | 1 | 5.1 | (6) (13°) |
| D | J | 71794 | GMA | 1 | Cracked 2nd pass | N.T. |
| E | J | J | GMA | 1 | Cracked 2nd pass | N.T. |
| F | L | L | GTA | 1 | 1.8 | 7 (180°) |

N.T. = Not Tested
()= Bend Specimen broke in half

TABLE V

| Weld No. | Rupture Life at 1600° F. (hours) - Stress in psi |  |  |  |  |
|---|---|---|---|---|---|
|  | 12,000 | 10,000 | 8,000 | 7,000 | 6,000 |
| 1 |  |  |  |  | 308.2 |
| 2 |  | 37.7 | 147.7 |  | 788.5 |
| 3 |  | 13.6 | 75.7 | 218.7 | 835.7 |
| 9 | 83.7 | 222.8 | 703.9 |  |  |
| 10 |  | 142.2 | 861.6 |  |  |
| 11 |  | 126.9 | 233.8 |  |  |
| 12 | 154.4 | 498.1 | 1857.4 |  |  |
| 13 |  | 82.0 | 360.9 | 515.1 |  |
| 14 |  | 51.4 | 177.5 | 1220.8 |  |
| 15 |  | 50.8 | 406.4 |  |  |
| 16 | 116.2 | 660.0 |  |  |  |
| 18 |  | 38.1 | 86.0 |  | 585.0 |
| 19 |  | 18.5 | 47.6 |  | 712.8 |
| 20 |  | 125.5 | 271.3 |  |  |
| 21 |  | 29.6 | 258.6 |  | 1202.6 |
| 22 | 107.7 | 296.5 |  | 327.6 |  |
| 23 |  | — | 56.6 |  | 692.5 |
| 24 |  | 9.2 | 46.7 | 144.1 | 842.7 |
| 25 |  | 12.2 | 74.1 | 100.1 |  |
| 26 |  | 65.2 |  |  | 3129.2 |

As can be seen from the results shown hereinabove in Table IV, filler metals of the invention were used to prepare Weld Nos. 1–26. All these welds were acceptable with either no cracks per section or a level of less than about 0.2 cracks per section. These results should be contrasted with the results shown for Weld Nos. A–F which were performed using filler metals outside the invention. All these welds showed numerous cracks per section and in the case of Weld Nos. B, D and E, they cracked so severely during the second pass that these joints could not be completed. Analysis of the welds prepared using alloys of the invention shows the tendency towards weld cracking when the limits for various elements are approached. For example, Weld Nos. 9 and 13 which exhibited 0.11 cracks per section employed a filler wire containing 0.15% and 0.13% boron, respectively, which are near the lower limit of about 0.1% for that element. Weld No. 17 contained 0.14% boron and 8.8% molybdenum (a high level for this element) and exhibited 0.22 cracks per section.

The stress-rupture characteristics of the welded joints shown hereinabove in Table V indicate the excellent load-bearing capacities of the alloys of this invention at elevated temperatures.

EXAMPLE III

To demonstrate the oxidation-resistance of the alloys of the invention, the welds described hereinabove in Example II were tested by exposing specimens in an air-5% water atmosphere at 1000° C., using a 24 hour cycle for a 500 hour test duration. The air-water mixture was flowing at 250 cubic centimeters per minute (cc/min) over the specimens, which were machined from the welded joints. The specimens were machined with the weld deposit comprising approximately 50% of the total specimen. The weight changes of the specimens were tested in both the un-descaled and descaled conditions. The specimens were removed from the testing apparatus and allowed to air cool to room temperature; the weight change was measured (un-descaled condition), the specimens were lightly descaled to remove the oxide formed and the descaled weight change of the specimens was measured. Descaling of all test specimens was done an S.S. White precision abrasive cleaning unit using 50 micron alumina propelled by dry $CO_2$. The 500 hour exposure weight change results shown hereinbelow in Table VI evidence the excellent oxidation-resistance of the preferred alloys of the invention, whereas welds prepared from filler wires not of the preferred composition have a decreased oxidation resistance. For example, Weld Nos. 18 and 19 prepared from filler wires containing high percentages of iron showed a decreased oxidation resistance. As noted hereinabove however, alloys outside the preferred compositional range while having a decreased oxidation resistance, nevertheless, may be suitably employed for many industrial applications not requiring the excellent oxidation resistance characteristic of preferred alloys of this invention.

TABLE VI

| Weld No. | Undescaled Weight Change (mg/cm²) | Descaled Weight Change (mg/cm²) |
|---|---|---|
| 9 | −.59 | −10.58 |

TABLE VI-continued

| Weld No. | Undescaled Weight Change (mg/cm²) | Descaled Weight Change (mg/cm²) |
| --- | --- | --- |
| 10 | −1.43 | −11.88 |
| 11 | −7.02 | −12.7 |
| 12 | .24 | −8.33 |
| 13 | −1.55 | −11.75 |
| 14 | −1.12 | −13.85 |
| 15 | 3.66 | 13.46 |
| 16 | −1.08 | −11.17 |
| 18 | −52. | −63.4 |
| 19 | Test discontinued after 72 hours due to extreme attack | |
| 21 | +.40 | −10.67 |
| 22 | −1.34 | −12.97 |
| 24 | −3.33 | −11.65 |
| 25 | −2.93 | −10.65 |

EXAMPLE IV

To demonstrate the tensile properties of alloys of the invention and of the welded joints, room and elevated temperature tensile tests were performed; the results of which are shown hereinbelow in Table VII. Alloy No. 1 was prepared as shown hereinabove in Example I, with the ⅜-inch square bar stock being further heat treated by annealing for one hour at 1950° F., followed by air cooling. Weld No. 3 was tested in the as-welded condition.

TABLE VII

| Alloy No. | Weld No. | Temp. °F. | 0.2% Y.S., (ksi) | U.T.S., (ksi) | Elong. in 1"% | R.A., % | Fracture Location |
| --- | --- | --- | --- | --- | --- | --- | --- |
| 1 | — | 70 | 46.5 | 115.4 | 21.0 | 55.8 | |
| | | 1400 | 30.4 | 55.0 | 34.0 | 34.0 | |
| | | 1600 | 24.6 | 30.0 | 80.5 | 70.0 | |
| | | 1800 | 12.7 | 15.8 | 79.0 | 63.0 | |
| — | 3 | 70 | 56.0 | 78.6 | 5.0 | 12.2 | Base |
| | | 1400 | 33.6 | 50.2 | 10.5 | 16.0 | Base |
| | | 1600 | 20.6 | 29.3 | 17.5 | 44.8 | Base |

EXAMPLE V

To demonstrate the corrosion-resistance of alloys of the invention, two standard corrosion tests were performed: (1) crevice corrosion test and (2) Huey test. The crevice corrosion test was performed using a 10% ferric chloride solution at room temperature. The 1-inch wrought plate prepared in accordance with Example I was machined to form a test specimen 1-inch by 2-inch by 3/16 -inch (1 inch × 2 inch × 3/16 inch). A rubber band ¼-inch wide was placed along the length of the specimen and the specimen then suspended in the ferric chloride solution for a period of 72 hours at 70° F. After this period, the samples were tested for their resistance to corrosion by measuring the weight loss in milligrams/square decimeter/day (mdd). The Huey tests were performed in accordance with the procedures outlined in recommended practice C of ASTM A-262 by exposing, to a boiling 65% nitric acid environment for 48 hour periods, a specimen machined from the wrought alloy prepared in Example I. After each period the samples were tested for their resistance to corrosion by measuring the weight loss and mdd and the results shown hereinbelow in Table VIII show the weight loss at the end of 5 periods (total exposure 240 hours) and also indicates whether or not the corrosion was accelerating (A) or maintaining constancy (C) over the 5 test periods. Similarly, the weight loss for the samples exposed to the ferric chloride solution are also shown in Table VIII and represent the weight loss after the one exposure period of 72 hours.

TABLE VIII

| Alloy No. | Test (1) FeCl₃ - Wt. Loss (mdd) | Test (2) Wt. Loss (mdd) | Huey Test Corrosion rate |
| --- | --- | --- | --- |
| 4 | 586 | 100.5 | A |
| 0 | 51 | 41.8 | C |
| P | 7 | 40.3 | C |
| 9 | 1124 | 94.3 | A |
| 12 | 644 | 36.6 | C |
| 14 | 665 | 47.3 | C |
| 15 | 1425 | 69.6 | A |
| 16 | 504 | 39.2 | C |
| 17 | 523 | 74.9 | A |
| 18 | 506 | 86.2 | A |
| 20 | 5 | 84.2 | C |
| G | 596 | 58.3 | C |
| J | 365 | 61.1 | A |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A hot-workable, cold-workable welding filler metal characterized by a capability for producing sound, oxidation-resistant weld deposits consisting essentially of (by weight) up to about 0.1% carbon, up to about 2% manganese, up to about 1% silicon, from about 19% to about 24% chromium, from about 15% to about 25% iron, from about 0.12% to about 0.4% boron, from about 4% to about 8% molybdenum, and the balance essentially nickel.

2. A filler metal in accordance with claim 1 containing from about 0.003% to about 0.06% carbon, up to about 1% manganese, up to about 0.4% silicon, from about 20% to about 24% chromium, from about 17% to about 23% iron, from about 0.15% to about 0.4% boron, from about 5% to about 7% molybdenum, and the balance essentially nickel.

3. As a new article of manufacture, a wrought filler metal having a composition as set forth in claim 1.

4. As a new article of manufacture, a wrought filler metal having a composition as set forth in claim 2.

* * * * *